(12) United States Patent
Wang et al.

(10) Patent No.: US 11,073,666 B1
(45) Date of Patent: Jul. 27, 2021

(54) PLUGGABLE TRANSCEIVER RETAINER

(71) Applicant: FINISAR CORPORATION, Sunnyvale, CA (US)

(72) Inventors: William H. Wang, Pleasanton, CA (US); Bill S. Wang, San Jose, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 16/809,257

(22) Filed: Mar. 4, 2020

(51) Int. Cl.
*H01R 13/62* (2006.01)
*G02B 6/42* (2006.01)
*H01R 43/26* (2006.01)
*H01R 13/639* (2006.01)
*H01R 13/627* (2006.01)

(52) U.S. Cl.
CPC ....... *G02B 6/4261* (2013.01); *H01R 13/6272* (2013.01); *H01R 13/639* (2013.01); *H01R 43/26* (2013.01)

(58) Field of Classification Search
CPC .. G02B 6/4261; H01R 43/26; H01R 13/6272; H01R 13/639; H01R 43/16
USPC .......................................................... 439/352
See application file for complete search history.

(56) References Cited

U.S. PATENT DOCUMENTS

| | | | | |
|---|---|---|---|---|
| 7,083,336 B2 * | 8/2006 | Kim | ...................... | G02B 6/4292 385/88 |
| 7,114,980 B1 * | 10/2006 | Wu | ...................... | H01R 13/6275 439/352 |
| 2002/0150343 A1 * | 10/2002 | Chiu | ...................... | G02B 6/3897 385/53 |
| 2007/0243749 A1 * | 10/2007 | Wu | ...................... | H01R 13/6596 439/352 |
| 2009/0209125 A1 * | 8/2009 | Bright | ................ | H01R 13/6275 439/352 |
| 2013/0115800 A1 * | 5/2013 | Chan | .................. | H01R 13/6335 439/372 |
| 2019/0312645 A1 * | 10/2019 | Ishii | ...................... | G02B 6/4246 |

* cited by examiner

*Primary Examiner* — Abdullah A Riyami
*Assistant Examiner* — Nelson R. Burgos-Guntin
(74) *Attorney, Agent, or Firm* — Blank Rome LLP

(57) ABSTRACT

An optoelectronic module may include a housing enclosing at least one optical transmitter or receiver, a slider configured to move with respect to the housing, and a retainer configured to engage both the slider and the housing to retain the slider with respect to the housing. The slider may include a resilient tab and at least one protrusion configured to engage a cage sized and shaped to receive the housing. The retainer may include a first end portion configured to abut the resilient tab of the slider.

20 Claims, 9 Drawing Sheets

PLUGGABLE TRANSCEIVER RETAINER

FIELD

The present disclosure relates to retainers for optoelectronic modules.

BACKGROUND

Unless otherwise indicated herein, the materials described herein are not prior art to the claims in the present application and are not admitted to be prior art by inclusion in this section.

Optoelectronic modules, such as transceivers, may be used to transmit data between different devices or different locations. In particular, optical signals may be used to rapidly communication data (via the optical signals) between different devices or different locations. However, most electronic devices operate using electrical signals. Accordingly, optoelectronic modules may be used to convert optical signals to electrical signals or convert electrical signals to optical electrical, so optical signals may be used to transmit data between electronic devices. Optoelectronic modules typically communicate with a host device by transmitting electrical signals to the host device and receiving electrical signals from the host device. These electrical signals may then be transmitted by the optoelectronic module as optical signals.

One type of host device that may be implemented with optoelectronic modules is a network switch. A network switch may include multiple ports or cages to receive optoelectronic modules. In some configurations, the optoelectronic modules may include a coupling mechanism such as a latch to retain the optoelectronic modules in their respective ports or cages in the network switch. The coupling mechanism may also permit the optoelectronic modules to be removed from the ports or cages. However, in some circumstances, an optoelectronic module may unintentionally disengage from its port or cage.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example, an optoelectronic module may include a housing enclosing at least one optical transmitter or receiver, a slider configured to move with respect to the housing, and a retainer configured to engage both the slider and the housing to retain the slider with respect to the housing. The slider may include a resilient tab and at least one protrusion configured to engage a cage sized and shaped to receive the housing. The retainer may include a first end portion configured to abut the resilient tab of the slider.

The retainer may be sized and shaped to surround at least a portion of the slider. The first end portion may extend towards an interior of the retainer. The retainer may include a second end portion configured to abut the housing. The first end portion and the second end portion may be positioned on a first side of the retainer. The retainer may include an engaging portion positioned on a second side of the retainer, opposite the first side. The first end portion and the second end portion of the retainer may be coplanar.

The housing may define an opening sized and shaped to receive the first end portion of the retainer to permit the first end portion to interface with the resilient tab of the slider. The optoelectronic module may include a handle coupled to the slider. The retainer may be sized and shaped to surround at least a portion of both the handle and the slider. The retainer may include a first side configured to abut a first surface of the housing facing the handle and a second side configured to abut a second surface of the housing facing the handle facing away from the handle.

The slider may be configured to move in a direction parallel to a longitudinal axis of the housing. The protrusion of the slider may be configured to engage a corresponding resilient tab of the cage. The slider may include at least one arm extending along the housing. The protrusion of the slider may be positioned on the arm. The resilient tab of the slider may extend towards a direction parallel to a longitudinal axis of the housing and may be biased towards the housing. The retainer may be substantially planar and may be formed of a resilient material. The retainer may include a resilient wire, and the first end portion may be a first end of the resilient wire.

In another example, a method may include positioning a first end portion of a retainer in an opening defined in a housing of an optoelectronic module such that the first end portion of the retainer abuts a resilient tab of a slider configured to move with respect to the housing. The method may include engaging the retainer with both the slider and the housing to retain the slider with respect to the housing.

In some aspects, the method may include bending the retainer to surround at least a portion of the slider. The retainer may be substantially planar and formed of a resilient material, and the method may include bending the retainer to a non-planar configuration prior to positioning the retainer to surround at least a portion of the slider. Engaging the retainer with the housing may include abutting a first side of the retainer with a first surface of the housing facing a handle and abutting a second side of the retainer with a second surface of the housing facing away from the handle Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1A:
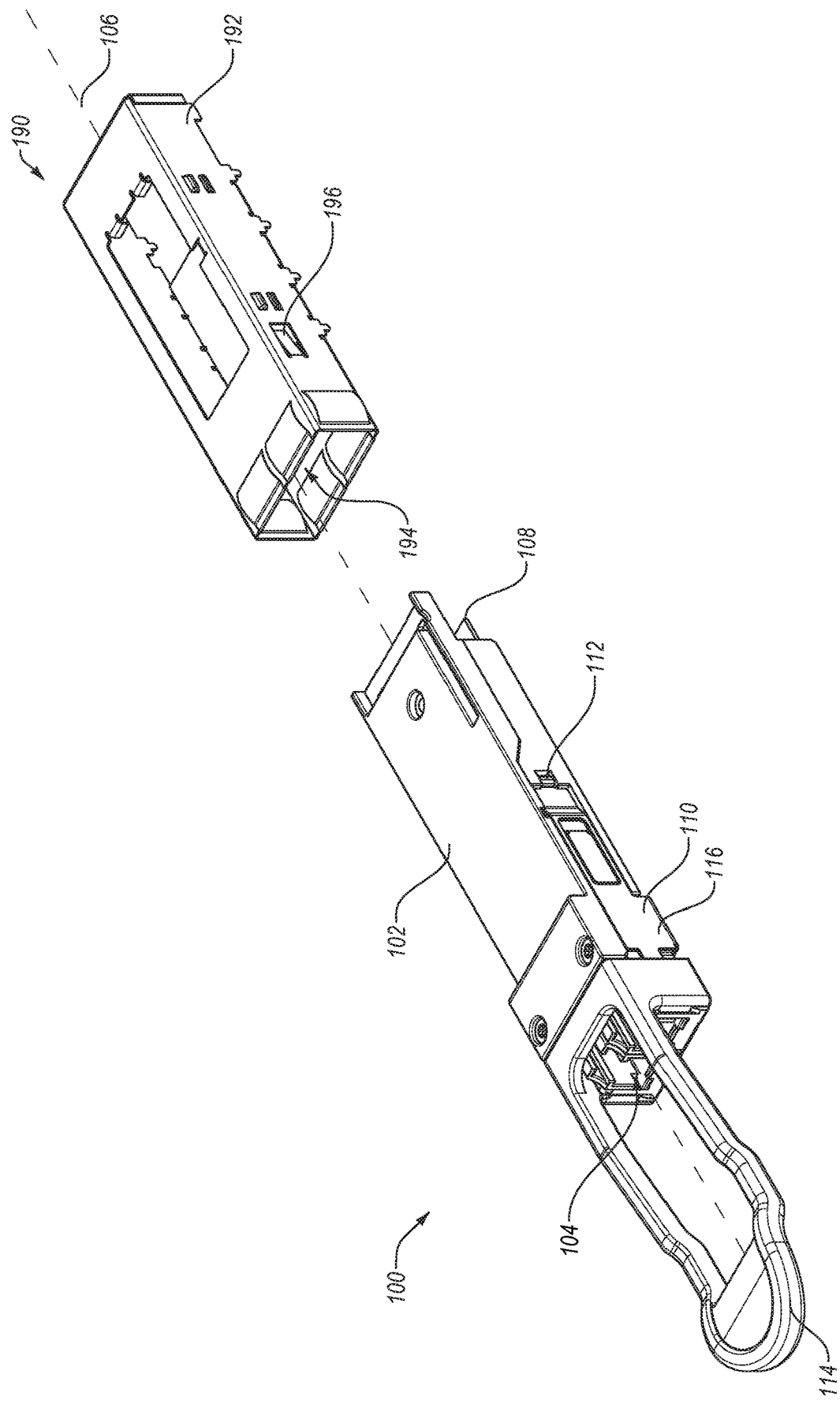
FIG. 1A is a perspective view of an optoelectronic module and a cage.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to retainers for optoelectronic modules, which may be implemented to prevent optoelectronic modules from unintentionally disengaging from a host device such as a network switch.

A network switch or other type of host device may be implemented to mechanically retain and communicatively couple multiple optoelectronic modules in a network. The network switch may include multiple ports or cages sized and shaped to receive optoelectronic modules. The optoelectronic modules may convert electrical signals to optical signals, or vice versa, to permit the optoelectronic modules to communicate with other network devices via optical signals. The optoelectronic modules may be communicatively coupled to the network switch, for example, to a printed circuit board assembly (PCBA) of the network switch, to permit the network switch to communicate with the other network devices.

In some configurations, the network switch and the optoelectronic modules may include a coupling mechanism such as a latch to retain the optoelectronic modules in their respective cages in the network switch. This coupling mechanism may also permit the optoelectronic modules to be removed from the cages of the network switch. However, in some circumstances, an optoelectronic module may unintentionally disengage from its cage. Accordingly, the described embodiments include retainers for optoelectronic modules, which may be implemented to prevent optoelectronic modules from unintentionally disengaging from the cages in a network switch.

Typically network switches may be shipped or distributed without optoelectronic modules positioned therein. Such configurations may be implemented, for example, to avoid damage to the optoelectronic modules during transport. However, in some circumstances it may be desirable to distribute network switches populated with optoelectronic modules. In particular, it may be desirable to ship network switches with optoelectronic modules positioned in at least some of the cages of the network switches. However, during movement associated with shipping, the optoelectronic modules may come loose or be shaken out of their respective cages. Furthermore, a release mechanism of an optoelectronic module may be unintentionally activated during shipping.

Optoelectronic modules that unintentionally disengage from their respective cages may result in damage to the optoelectronic modules or the network switch. Accordingly, the disclosed embodiments may include retainers to prevent optoelectronic modules from unintentionally releasing from the cages of the network switch, for example, during shipping. In particular, the disclosed embodiments may deactivate or disable a release mechanism of the optoelectronic module, thereby preventing the optoelectronic module from being removed from the cage of the network switch.

FIGS. 1A-1D illustrate an example of an optoelectronic module 100 and a w corresponding cage 190. In particular, FIG. 1A is a perspective view of the optoelectronic module 100 and the cage 190. As illustrated in FIG. 1A, the optoelectronic module 100 includes a housing 102 which may enclose optical, electrical and optoelectronic components positioned therein. For example, the optoelectronic module 100 may include optoelectronic components such optical transmitters (e.g. lasers, etc.) and optical receivers (e.g., photodiodes, etc.) to convert electrical signals to optical signals and optical signals to electrical signals. The optoelectronic module 100 may also include corresponding optics such as lenses, collimators, filters, isolators, and the like to direct and modulate optical signals travelling to and from the optoelectronic components. The optoelectronic module 100 may include any suitable electrical components, such as drivers to drive the optical transmitters, amplifiers to amplify signals from the optical receivers, controllers to control the operation of the optoelectronic module 100 and the like. The above-mentioned optoelectronic, optical, and electrical components may be at least partially enclosed in a housing.

As illustrated, the optoelectronic module 100 may include one or more ports 104 to mechanically and optically couple the optoelectronic module 100 to optical fibers. The ports 104 may be sized and shaped to receive a connector of the optical fiber, such as ferrule or other suitable coupler. In the illustrated configuration, the optoelectronic module 100 includes two ports 104, which corresponds to two optical fibers, although any suitable configuration may be implemented. In the illustrated configuration, the optoelectronic module 100 extends along a longitudinal axis 106 and the optical fibers may be inserted into the ports 104 in a direction parallel to the longitudinal axis 106.

When optical fibers are coupled to the optoelectronic module 100, the optoelectronic module 100 may send and receive optical signals with other components in a network. The optoelectronic module 100 may include an electrical coupling 108 such as an edge connector to electrically couple the optoelectronic module 100 to a host device. Accordingly, the optoelectronic module 100 may permit the host device to communicate with other components in the network by converting electrical signals to optical signals to be transmitted to the other components in the network, and converting received optical signals to electricals signals to be used by the host device.

The cage 190 may include a body 192 defining an opening 194 sized and shaped to receive the optoelectronic module 100 (or the housing 102 of the optoelectronic module 100). The cage 190 may be included in a host device to mechanically and electrically couple the optoelectronic module 100. In particular, the cage 190 may receive and retain the optoelectronic module 100 in the opening 194. Furthermore, the host device may include an electrical coupling such as a socket that corresponds to the electrical coupling 108 of the optoelectronic module 100. The socket may receive the edge connector of the optoelectronic module 100 to electrically couple the optoelectronic module 100 to the host device.

Although the illustrated configuration includes one cage 190, the host device may include any suitable number of cages to interface with multiple optoelectronic modules. For example, if the host device is a fiber optic network switch, it may include configurations of 5, 8, 12, 24, 32, 48, 54 ports or any other suitable number of ports and corresponding optoelectronic modules.

The optoelectronic module 100 and the cage 190 may include a coupling mechanism to retain the optoelectronic module 100 with respect to the cage 190. In particular the cage 109 may include resilient tabs 196 and the optoelectronic module 100 may include a slider 116 with arms 110 configured to engage with the tabs 196 of the cage 190 to prevent removal of the optoelectronic module 100 from the cage 190. In particular, the arms 110 may include protrusions 112 that engage the tabs 196 of the cage 190 thereby preventing movement of the optoelectronic module 100, for example, in a direction parallel to the longitudinal axis 106. The slider 116 and the arms 110 may move with respect to the housing 102 of the optoelectronic module 100, in a direction parallel to the longitudinal axis 106, to engage or disengage the protrusions 112 with respect to the tabs 196. As shown, the arms 110 extend along the housing 102 in a direction parallel to the longitudinal axis 106.

The optoelectronic module 100 may include a handle 114 coupled to the slider 116 to permit a user to move the slider 116 in a direction parallel to the longitudinal axis 106 to engage or disengage the optoelectronic module 100 with respect to the cage 190. In the illustrated configuration, the handle 114 extends in a direction parallel to the longitudinal axis 106 and is sized and shaped to be grasped or otherwise manipulated by the user.

Figure 1B:
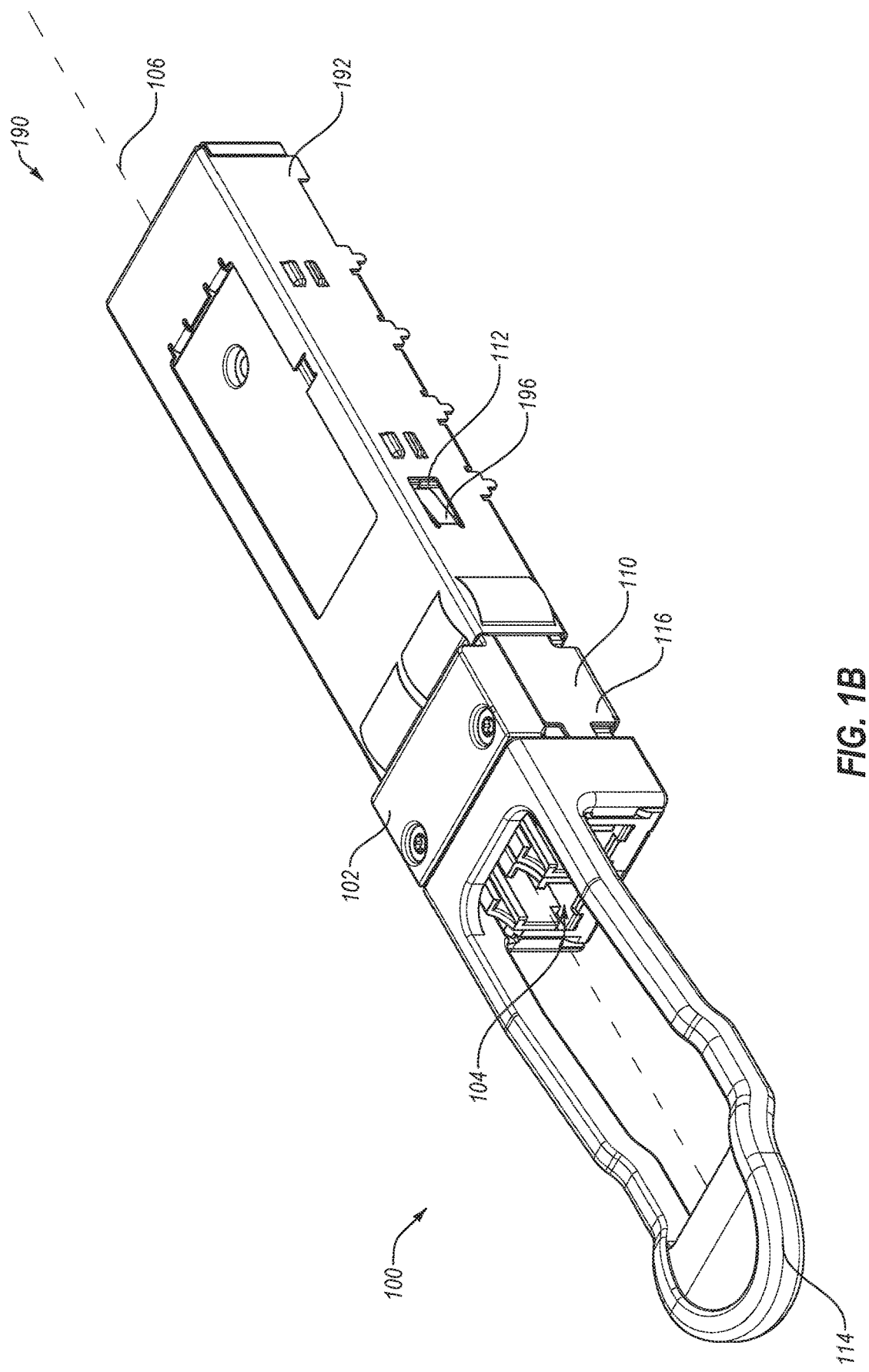
FIG. 1B is a perspective view of the optoelectronic module positioned inside of the w cage.

FIG. 1B is a perspective view of the optoelectronic module 100 positioned inside of the cage 190. The optoelectronic module 100 may be inserted in the opening 194 and slid into the cage 190 until the housing 102 abuts the cage 190. Once the optoelectronic module 100 is positioned in the cage 190, the protrusions 112 may engage the tabs 196 to prevent the optoelectronic module 100 from being removed from the cage 190, as shown. Since the tabs 196 are resilient, they may be displaced by the protrusions 112 as the optoelectronic module 100 is inserted into the cage 190, until the protrusions 112 move beyond and abut the ends of the tabs 196, in the engaged position shown.

Figure 1C:
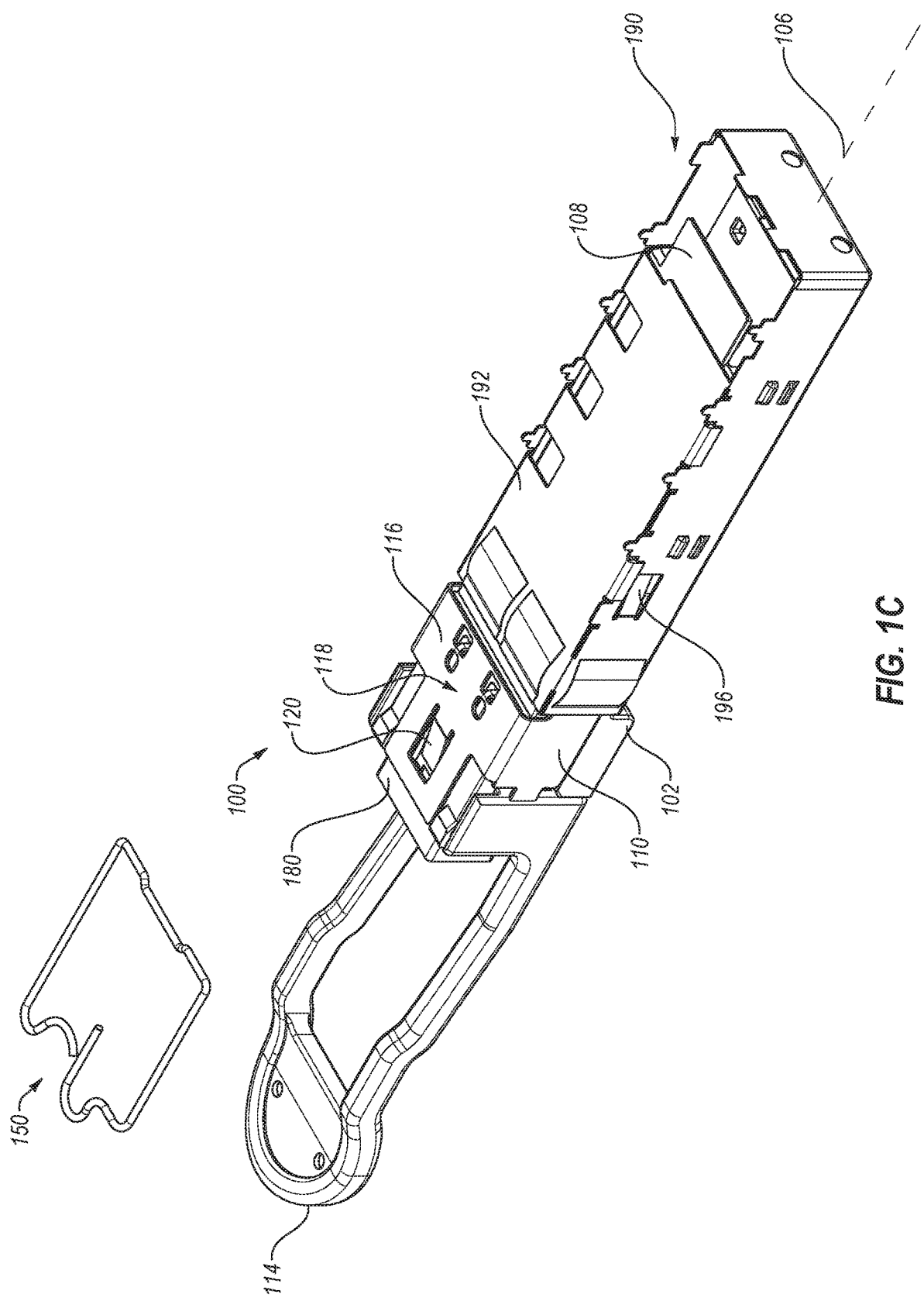
FIG. 1C is another perspective view of the optoelectronic module positioned inside of the cage with a retainer and a plug.

FIG. 1C is another perspective view of the optoelectronic module 100 positioned inside of the cage 190. In addition, FIG. 1C illustrates a retainer 150 and a plug 180. The retainer 150 may be implemented to prevent the optoelectronic module 100 from unintentionally disengaging from the cage 190. The plug 180 may be sized and shaped to be positioned in the ports 104. The plug 180 may occlude the ports 104 to prevent contaminants such as dust and material from entering the ports 104, for example, during transport, shipping or otherwise when the optoelectronic module 100 is not in use and is not coupled to optical fibers. Thus, the retainer 150 and the plug 180 may avoid damage to the optoelectronic module 100 during transport.

As shown in FIG. 1C, the slider 116 includes a resilient tab 120 that generally extends towards a direction parallel to the longitudinal axis 106 and is biased towards the housing 102 of the optoelectronic module 100. The resilient tab 120 may be positioned on a lateral portion 118 of the slider 116, which extends between and is coupled to the arms 110.

While the arms 110 extend along two opposite facing sides of the optoelectronic module 100, the lateral portion 118 may extend perpendicular to the arms 110, as shown. In the illustrated configuration, the lateral portion 118 and the arms 110 are integral with the slider 116, and form a u-shaped slider member (e.g., having a u-shaped cross-section). In such circumstances, the slider member may include two arm portions (e.g., arms 110) and the lateral portion 118 extending therebetween. However, other suitable configurations may be implemented.

As will be described in further detail below, the retainer 150 may be configured to deactivate or disable a release mechanism of the optoelectronic module 100, thereby preventing the optoelectronic module 100 from unintentionally releasing from the cage 190. Such configuration may permit network switches to be shipped with optoelectronic modules positioned in the cages, without the optoelectronic modules coming loose of their respective cages. Accordingly, the retainer 150 may prevent damage to the optoelectronic module 100 or the network switch during shipping.

As explained above, the slider 116 may move with respect to the housing 102 of the optoelectronic module 100 in a direction parallel to the longitudinal axis 106 to engage or disengage the protrusions 112 with respect to the tabs 196. Furthermore, the handle 114 is coupled to the slider 116 to permit a user to move the slider 116 in a direction parallel to the longitudinal axis 106 to engage or disengage the optoelectronic module 100 with respect to the cage 190. In the position shown in FIG. 1C, the slider 116 is in an engaged or locked position, with the slider 116 positioned towards the electrical coupling 108 along the longitudinal axis 106. In this position, the handle 114 is also positioned towards the electrical coupling 108, with the handle 114 abutting the housing 102, for example, as shown in FIG. 1B.

In a disengaged or unlocked position, the slider 116 may be positioned further from the electrical coupling 108 along the longitudinal axis 106. In this position, the protrusions 112 of the slider 116 may disengage the tabs 196 of the cage 190 to permit the optoelectronic module 100 to be removed from the cage 190. In particular, the protrusions 112 may displace the tabs 196 in a direction away from the optoelectronic module 100, permitting the slider 116 and the protrusions 112 to move past the tabs 196, for example, to permit the optoelectronic module 100 to be removed from the cage 190. A user may move the slider 116 to the disengaged or unlocked position by pulling on the handle 114, which is coupled to the slider 116. Thus, when a user pulls on the handle 114, the slider 116 may be moved to the disengaged or unlocked position, thereby permitting the protrusions 112 of the slider 116 to move past the tabs 196.

The slider 116 may not move beyond the disengaged or unlocked position, so when the user continues to pull on the handle 114, the entire optoelectronic module 100 will be pulled along with the handle 114, thereby pulling the optoelectronic module 100 from the cage 190. In practice, the when the user pulls on the handle 114 the optoelectronic module 100 may be removed from the cage 190 in a continuous motion, with the slider 116 first being pulled into the disengaged or unlocked position and then the optoelectronic module 100 being pulled from the cage 190.

The retainer 150 may be configured to prevent the slider 116 (and the handle 114) from being moved with respect to the housing 102 or the rest of the optoelectronic module 100 (e.g., in the longitudinal direction) to the disengaged or unlocked position. This in turn prevents the optoelectronic module 100 from being removed from the cage, and from unintentional release from the cage 190.

Figure 1D:
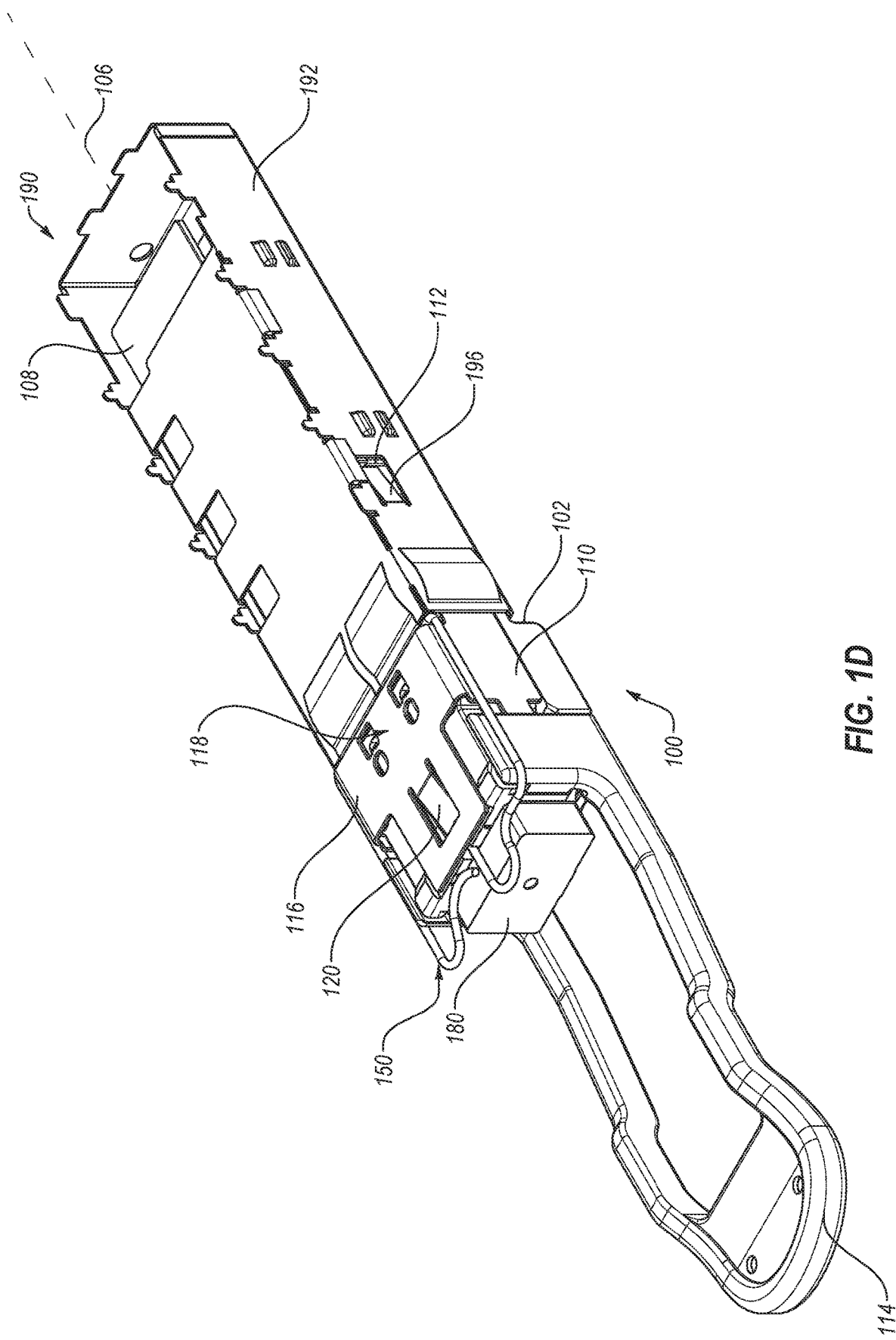
FIG. 1D is another perspective view of the optoelectronic module positioned inside of the cage with the retainer engaged with the optoelectronic module.

FIG. 1D is another perspective view of the optoelectronic module 100 with the retainer 150 engaged with the optoelectronic module 100. In the illustrated configuration, the retainer 150 surrounds the slider 116, a portion of the handle 114 and a portion of the housing 102 to retain the slider 116 in a fixed position (e.g., the engaged or locked position) with respect to the housing 102. As will be described in further detail below, an end portion of the retainer 150 may engage with the resilient tab 120 of the slider 116 to prevent the slider 116 from moving with respect to the housing 102 in a direction parallel to the longitudinal axis 106 to the disengaged or unlocked position (e.g., in a direction away from the electrical coupling 108). Additionally or alternatively, the retainer 150 may engage with and abut a portion of the housing 102, which may also prevent the slider 116 from moving with respect to the housing 102 in a direction parallel to the longitudinal axis 106 to the disengaged or unlocked position.

As shown, the retainer 150 may be formed of or may include a wire bent into a configuration to retain the slider 116 with respect to the housing 102. In such configurations, the retainer 150 may be generally rectangular and planar, with a size and shape generally corresponding to the lateral portion 118 of the slider 116 and a portion of the handle 114. The retainer 150 may include rounded corners that generally correspond to the edges of the slider 116 on one side, and edges of the handle 114 on the other side. However, other configurations of the retainer 150 may be implemented according to the concepts described herein.

The retainer 150 may be formed of a resilient material (such as a resilient wire) to permit the retainer 150 to engage the optoelectronic module 100. In particular, the retainer 150 may be bent or otherwise manipulated to permit the retainer 150 to be positioned around the slider 116, a portion of the handle 114 and a portion of the housing 102. Once positioned to engage the optoelectronic module 100, the retainer 150 may return to its original shape as it retains the slider 116 in the engaged or locked position with respect to the housing 102.

Figure 2A:
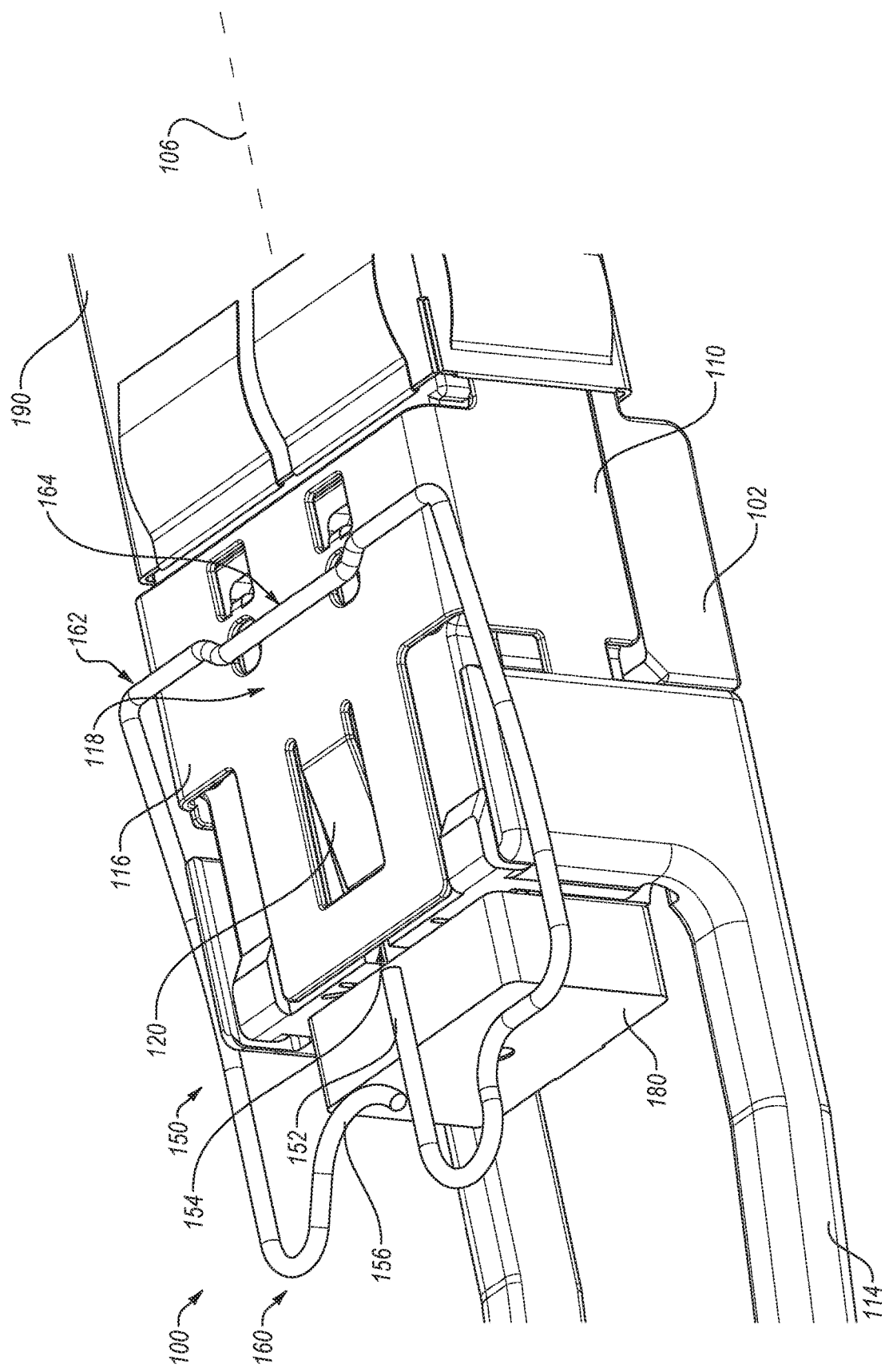
FIGS. 2A-2C are perspective views of a portion of the optoelectronic module and the retainer.
Figure 2B:
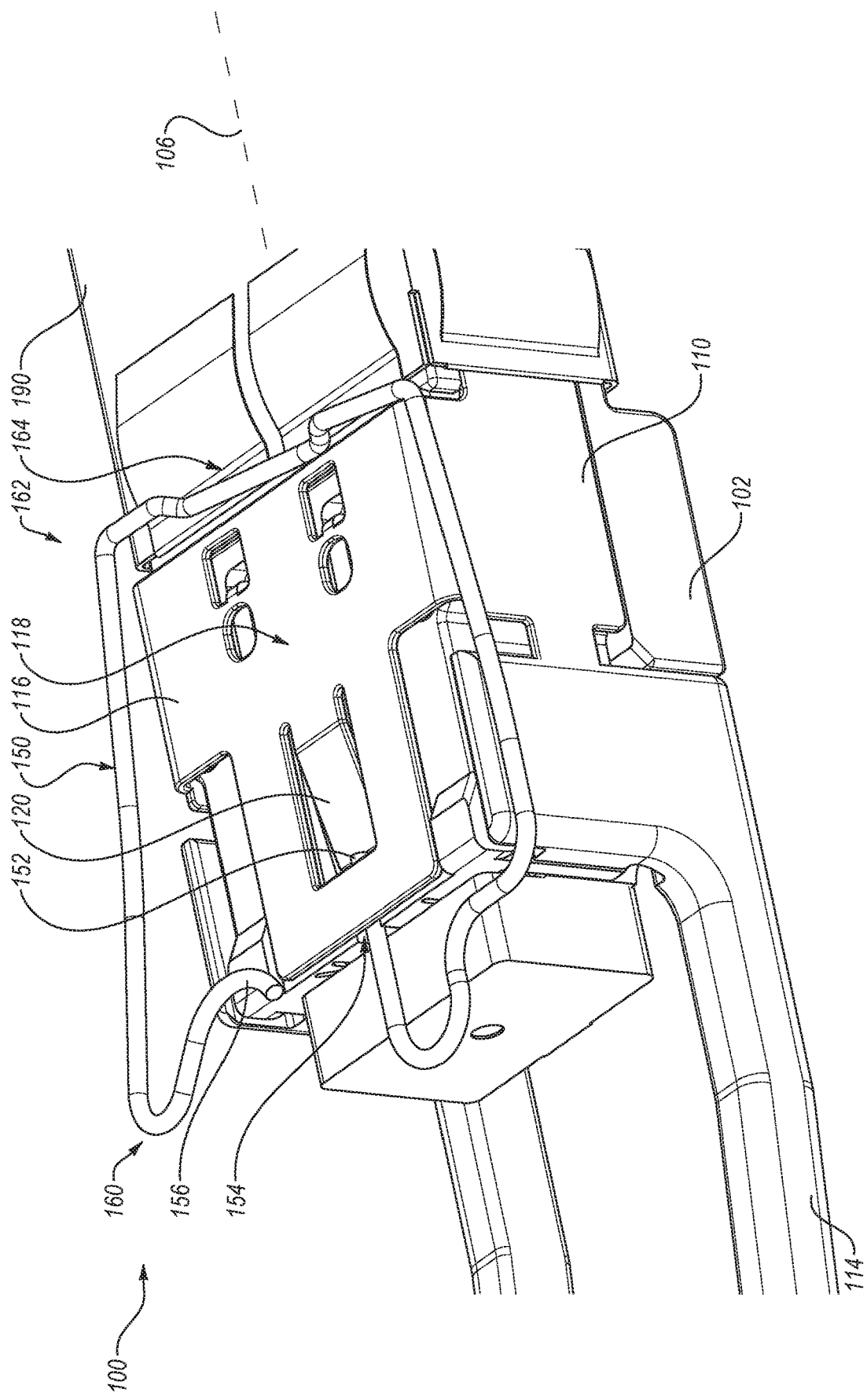
Figure 2C:
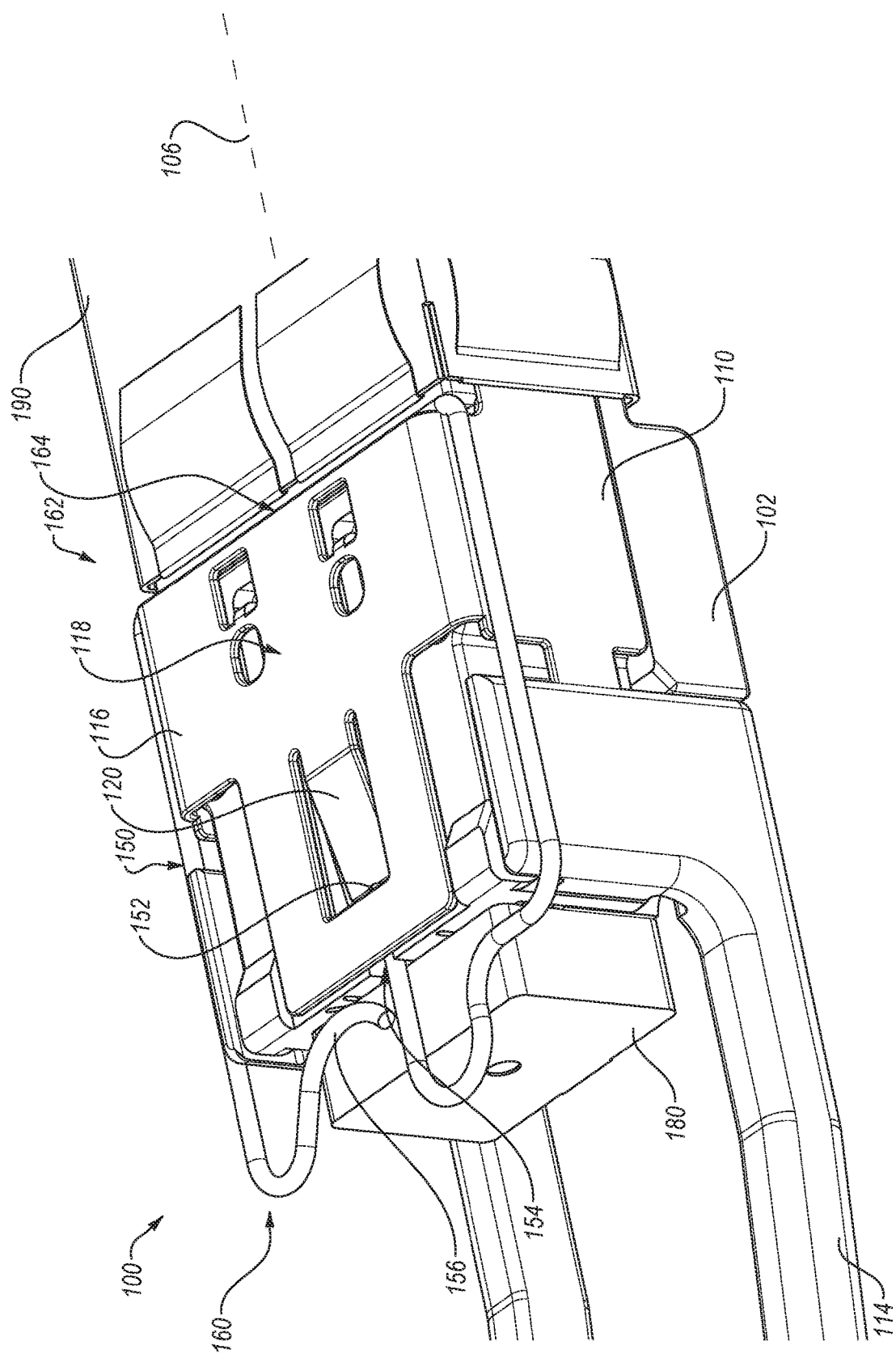

FIGS. 2A-2C are perspective views of a portion of the optoelectronic module 100 and the retainer 150. With reference to FIGS. 2A-2C, engaging the retainer 150 with the optoelectronic module 100 will be described in further detail. As shown in FIG. 2A, the retainer 150 may extend between a first side 160 and an oppositely positioned second side 162. The retainer 150 may include an end portion 152 on the first side 160 of the retainer 150. The end portion 152 may generally extend towards the interior or center of the retainer 150. The end portion 152 may face towards the interior or center of the retainer 150. In the position of the retainer 150 shown, the end portion 152 extends in a direction parallel to the longitudinal axis 106. The end portion 152 may be an end of a resilient wire, in configurations where the retainer 150 is formed of a wire.

The retainer 150 may include an engaging portion 164 on the second side 162 of the retainer 150. The engaging portion 164 may be offset from the second side 162 of the retainer 150 to interface with a surface of the housing 102, as will be described in further detail below.

The housing 102 of the optoelectronic module 100 may define an opening 154 sized and shaped to receive the end portion 152 of the retainer 150. In the illustrated configuration, the slider 116 and the housing 102 cooperatively define the opening 154, bounding the opening 154 on opposite sides, although other configurations may be implemented.

To engage the retainer 150 with the optoelectronic module 100, the end portion 152 of the retainer 150 may be positioned in the opening 154. As shown, the position of the opening 154 may correspond with and may be aligned with the resilient tab 120, thereby permitting the end portion 152 to engage with the resilient tab 120 of the slider 116 when the end portion 152 is positioned in the opening 154. This may in turn prevent the slider 116 from moving with respect to the housing 102, as will be described in further detail below.

FIG. 2B illustrates the end portion 152 of the retainer 150 positioned in the opening 154. As shown, the end portion 152 extends through the opening 154 and engages the resilient tab 120 of the slider 116. As mentioned above, the retainer 150 may be resilient, thereby permitting the retainer 150 to be bent or manipulated to be positioned around the slider 116, a portion of the handle 114 and a portion of the housing 102. FIG. 2B illustrates the retainer 150 in a bent position as it is positioned around the lateral portion 118 of the slider 116 and a portion of the handle 114.

In particular, a second end portion 156 of the retainer 150 may be lifted to bend the retainer 150 as it positioned around the lateral portion 118 of the slider 116. The end portion 156 may be moved with respect to the end portion 152 because of the resiliency of the retainer 150. Thus, while the retainer 150 is substantially planar in its unbent position, for example, as shown in FIG. 2A, the retainer 150 may be bent to the non-planar configuration shown in FIG. 2B. In this bent position, the second end portion 156 is offset or non-coplanar with the end portion 152.

FIG. 2C illustrates the retainer 150 engaged with the optoelectronic module 100. Since the retainer 150 is resilient, it may return to its original shape or unbent position with the retainer 150 being substantially planar (and the end portion 156 coplanar with the end portion 152) as shown in FIG. 2C. As shown, in the engaged position, the retainer 150 surrounds the slider 116 (e.g., the lateral portion 118), a portion of the handle 114 and a portion of the housing 102.

The end portion 152 is positioned in the opening 154 and is engaged with the resilient tab 120 of the slider 116 to prevent the slider 116 from moving with respect to the housing 102 in a direction parallel to the longitudinal axis 106 to the disengaged or unlocked position. Further, the first side 160 of the retainer 150 at the end portion 156 abuts the housing 102 proximate the plug 180 or the ports 104 and the second side 162 of the retainer 150 (opposite the first side 160) abuts the housing 102 at the engaging portion 164 proximate the cage 190, thereby preventing the slider 116 from moving with respect to the housing 102 in a direction parallel to the longitudinal axis 106 to the disengaged or unlocked position.

Figure 3A:
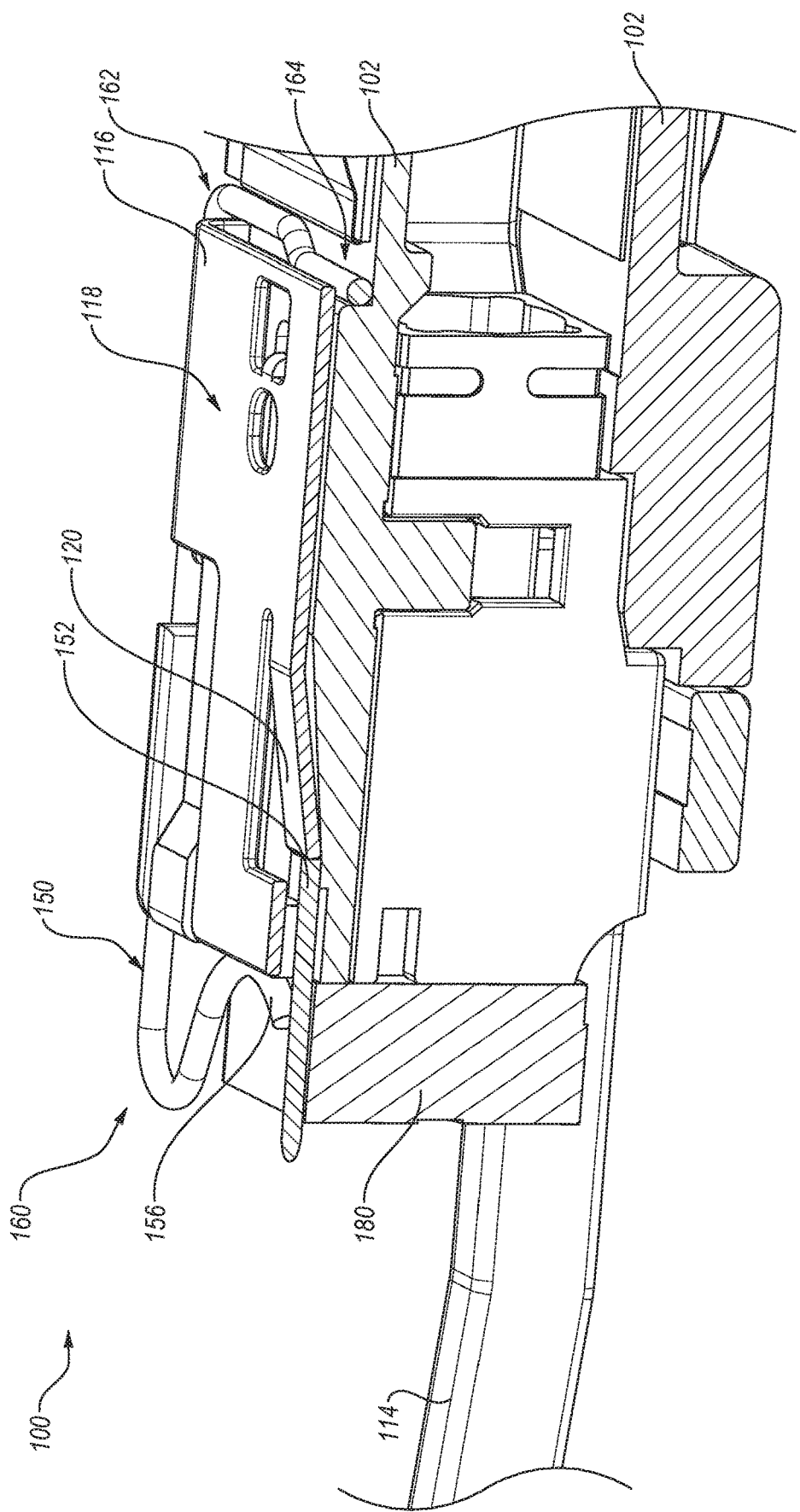
FIGS. 3A-3B are section views of the optoelectronic module.
Figure 3B:
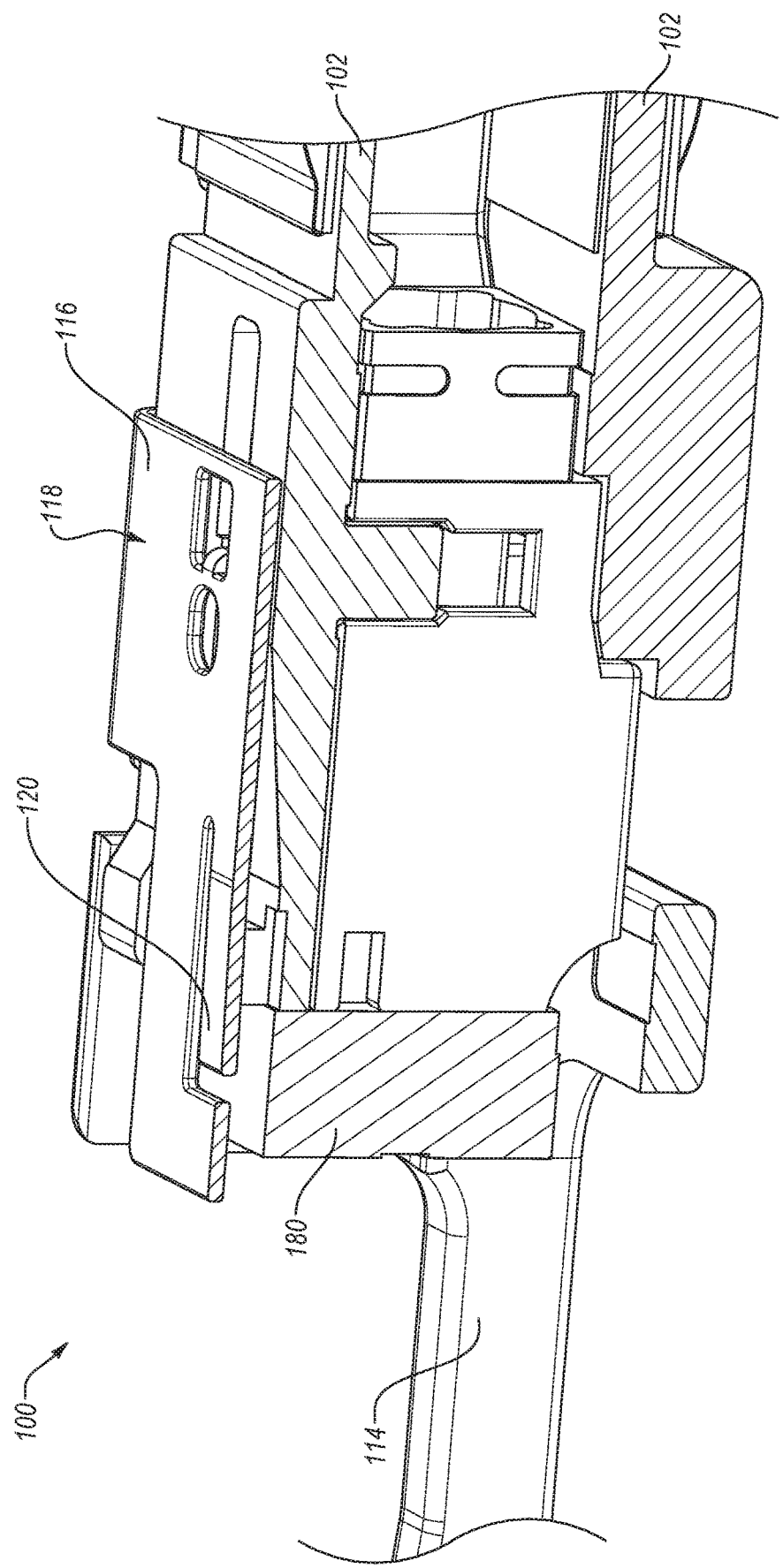

FIGS. 3A-3B are section views of the optoelectronic module 100. In particular, FIG. 3A is a section view of the optoelectronic module 100 engaged with the retainer 150, and FIG. 3B is a section view of the optoelectronic module 100 in a disengaged position.

As shown in FIG. 3A, when the retainer 150 is engaged with the optoelectronic module 100, the end portion 156 of the retainer 150 abuts the housing 102 on the first side 160 of the retainer 150 and the engaging portion 164 of the retainer 150 abuts the housing 102 on the second side 162 of the retainer 150. In particular, the end portion 156 of the retainer 150 abuts a surface of the housing 102 facing the handle 114 and the engaging portion 164 abuts a surface of the housing 102 facing away from the handle 114. Accordingly, the retainer 150 is fixed with respect to the housing 102. Furthermore, the end portion 152 on the first side 160 abuts the resilient tab 120 of the slider 116. Accordingly, the retainer 150 is fixed with respect to the slider 116. Thus, in the illustrated position, the retainer 150 is fixed with respect to both the housing 102 and the slider 116, thereby retaining the slider 116 with respect to the housing 102. This in turn prevents the slider 116 from moving with respect to the housing 102 to deactivate or disable the release mechanism of the slider 116, thereby preventing release of the optoelectronic module 100 from the cage 190.

To remove or disengage the retainer 150 from the optoelectronic module 100, the end portion 156 of the retainer 150 may be lifted or displaced such that the end portion 156 does not abut the housing 102, the second side 162 of the retainer 150 may be lifted such that the engaging portion 164 does not abut the housing 102, thereby permitting the retainer 150 to be removed from the optoelectronic module 100.

FIG. 3B illustrates the optoelectronic module 100 with the retainer 150 removed, in a disengaged or unlocked position. When the end portion 152 of the retainer 150 is not abutting the resilient tab 120 of the slider 116, the slider 116 may move with respect to the housing 102 to the disengaged or unlocked position shown. For example, a user may move the slider 116 to the disengaged or unlocked position by pulling on the handle 114, which is coupled to the slider 116.

In the disengaged or unlocked position, the slider 116 may be positioned further along the longitudinal axis 106 away from the cage 190, as shown. In this position, the protrusions 112 of the slider 116 may disengage the tabs 196 of the cage 190 to permit the optoelectronic module 100 to be removed from the cage 190. Furthermore, the slider 116 may not move beyond the disengaged or unlocked position shown, so when the user continues to pull on the handle 114, the entire optoelectronic module 100 will be pulled along with the handle 114, thereby removing the optoelectronic module 100 from the cage 190.

As explained above, the disclosed configurations of the retainer 150 may deactivate or disable the release mechanism of the optoelectronic module 100, to prevent the optoelectronic module 100 from unintentionally releasing from the cage 190, for example, during shipping or transport. In particular, the retainer 150 may be implemented to deactivate or disable the slider 116 release mechanism, thereby preventing the optoelectronic module 100 from being removed from the cage 190, which may be implemented in a network switch.

In one example, a method of engaging the retainer 150 with the optoelectronic module 100 may include positioning the end portion 152 of the retainer 150 in the opening 154 defined in the housing 102 of the optoelectronic module 100 such that the end portion 152 of the retainer 150 abuts the resilient tab 120 of the slider 116, which is configured to move with respect to the housing 102. The method may include engaging the retainer 150 with both the slider 116 and the housing 102 to retain the slider 116 with respect to the housing 102.

The method may include bending the retainer 150 to surround at least a portion of the slider 116. As explained above, the retainer 150 may be substantially planar and formed of a resilient material. The method may include bending the retainer 150 to a non-planar configuration prior to positioning the retainer 150 to surround at least a portion of the slider 116. In some aspects, engaging the retainer 150 with the housing 102 may include abutting the first side 160 of the retainer 150 with a first surface of the housing 102 facing the handle 114 and abutting the second side 162 of the retainer 150 with a second surface of the housing 102 facing away from the handle 114.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module for use with a cage having an opening therein, the module comprising:
a housing enclosing at least one optical transmitter or receiver, the housing configured to insert in a first direction into the opening of the cage;
a slider configured to move with respect to the housing, the slider including a resilient tab and at least one protrusion, the at least one protrusion configured to engage selectively in a second direction with the cage; and
a retainer configured to engage both the slider and the housing to retain the slider with respect to the housing, the retainer including a first end portion configured to abut the resilient tab of the slider.

2. The optoelectronic module of claim 1, wherein the retainer is sized and shaped to surround at least a portion of the slider.

3. The optoelectronic module of claim 1, wherein the first end portion extends towards an interior of the retainer.

4. The optoelectronic module of claim 1, the retainer further comprising a second end portion configured to abut in the first direction against a first shoulder on the housing.

5. The optoelectronic module of claim 4, wherein the first end portion and the second end portion are positioned on a first side of the retainer, further comprising an engaging portion positioned on a second side of the retainer, opposite the first side, the engaging portion configured to abut in the second direction against a second shoulder on the housing.

6. The optoelectronic module of claim 5, wherein the first end portion and the second end portion are coplanar.

7. The optoelectronic module of claim 1, wherein the housing defines an opening sized and shaped to receive the first end portion of the retainer to permit the first end portion to interface with the resilient tab of the slider.

8. The optoelectronic module of claim 1, further comprising a handle coupled to the slider.

9. The optoelectronic module of claim 8, wherein the retainer is sized and shaped to surround at least a portion of both the handle and the slider.

10. The optoelectronic module of claim 8, wherein the retainer includes a first side configured to abut a first surface of the housing facing the handle and a second side configured to abut a second surface of the housing facing the handle facing away from the handle.

11. The optoelectronic module of claim 1, wherein the slider is configured to move in a direction parallel to a longitudinal axis of the housing.

12. The optoelectronic module of claim 1, the slider comprising at least one arm extending along the housing, wherein the protrusion of the slider is positioned on the arm.

13. The optoelectronic module of claim 1, wherein the resilient tab of the slider extends towards a direction parallel to a longitudinal axis of the housing and is biased towards the housing.

14. The optoelectronic module of claim 1, wherein the retainer is substantially planar and is formed of a resilient material.

15. The optoelectronic module of claim 1, the retainer comprising a resilient wire, wherein the first end portion is a first end of the resilient wire.

16. A method to keep an optoelectronic module installed in a cage, the method comprising:
inserting the module in a first direction in an opening of the cage;
locking the module in a second, opposite direction in the opening by:
moving a slider on a housing of the module to a locked position, and engaging a protrusion on the slider against a first resilient tab of the cage; and
retaining the slider in the locked position on the housing by:
positioning a first end portion of a retainer in an opening defined in the housing of the optoelectronic module such that the first end portion of the retainer abuts a second resilient tab of the slider; and
engaging the retainer with both the slider and the housing to retain the slider in the locked position with respect to the housing.

17. The method of claim 16, further comprising bending the retainer to surround at least a portion of the slider.

18. The method of claim 16, wherein the retainer is substantially planar and formed of a resilient material, further comprising bending the retainer to a non-planar configuration prior to positioning the retainer to surround at least a portion of the slider.

19. The method of claim 16, wherein engaging the retainer with the housing includes abutting a first side of the retainer with a first surface of the housing facing a handle and abutting a second side of the retainer with a second surface of the housing facing away from the handle.

20. The optoelectronic module of claim 1, wherein the slider is configured to move between first and second positions relative to the housing, the at least one protrusion with the slider in the first position configured to engage the cage in the second direction, the at least one protrusion with the slider in the second position configured to disengage from the cage, the retainer configured to retain the slider in the first position with respect to the housing.

* * * * *